United States Patent

Boyce et al.

[11] Patent Number: 5,974,185
[45] Date of Patent: Oct. 26, 1999

[54] METHODS AND APPARATUS FOR ENCODING VIDEO DATA USING MOTION VECTORS FOR DECODING BY REGULAR OR DOWNCONVERTING DECODERS

[75] Inventors: Jill Boyce, Manalapan, N.J.; Larry Pearlstein, Newtown, Pa.

[73] Assignee: Hitachi America, Ltd., Tarrytown, N.J.

[21] Appl. No.: 09/100,632

[22] Filed: Jun. 19, 1998

Related U.S. Application Data

[62] Division of application No. 08/587,207, Jan. 16, 1996, Pat. No. 5,825,927.

[51] Int. Cl.[6] .................................................. G06K 9/36
[52] U.S. Cl. ........................ 382/239; 348/404; 348/431
[58] Field of Search .................................... 382/107, 232, 382/236, 245–246, 239; 348/448, 426, 413, 416, 554–556, 402, 630

[56] References Cited

U.S. PATENT DOCUMENTS

| | | | |
|---|---|---|---|
| 4,238,773 | 12/1980 | Tsuboka et al. | 358/183 |
| 5,057,916 | 11/1991 | Krause et al. | 348/416 |
| 5,091,785 | 2/1992 | Canfield et al. | 358/183 |
| 5,191,417 | 3/1993 | Skinner et al. | 358/141 |
| 5,216,719 | 6/1993 | Oh | 381/36 |
| 5,235,420 | 8/1993 | Gharavi | 358/136 |
| 5,237,460 | 8/1993 | Miller et al. | 360/8 |
| 5,262,854 | 11/1993 | Ng | 358/133 |
| 5,313,303 | 5/1994 | Ersoz et al. | 348/439 |
| 5,325,124 | 6/1994 | Keith | 348/391 |
| 5,325,125 | 6/1994 | Naimpally et al. | 348/402 |
| 5,325,126 | 6/1994 | Keith | 348/418 |
| 5,367,318 | 11/1994 | Beudin et al. | 345/201 |
| 5,386,241 | 1/1995 | Park | 348/565 |
| 5,398,072 | 3/1995 | Auld | 348/426 |
| 5,408,270 | 4/1995 | Lim | 348/429 |
| 5,412,428 | 5/1995 | Tahara | 348/396 |
| 5,418,570 | 5/1995 | Ueno et al. | 348/413 |
| 5,422,677 | 6/1995 | Do | 348/568 |
| 5,446,498 | 8/1995 | Boon | 348/448 |
| 5,448,300 | 9/1995 | Yamada et al. | 348/390 |

(List continued on next page.)

OTHER PUBLICATIONS

A. Hoffman et al., "Future Prospects of Cable TV Networks, New Technologies and New Services", *Laboratoire de Telecommunications et Teledetection*, pp. 13–22.

International Standards Organization—Moving Picture Expert Group, Draft of Recommendation H.262, ISO/IEC 1–13818 titled "MPEG–2 Systems", Nov. 1993.

International Standards Organization—Moving Picture Experts Group, Draft of Recommendation H.262, ISO/IEC 13818–2 titled "Information Technology—Generic Code of Moving Pictures and Associated Audio", Nov. 1993.

Dong–Ho Lee et al., "HDTV Video Decoder Which Can Be Implemented With Low Complexity", *IEEE Journal*, pp. 6–7.

*Primary Examiner*—Jon Chang
*Assistant Examiner*—Jayanti K. Patel
*Attorney, Agent, or Firm*—Michaelson & Wallace; Peter L. Michaelson; Michael P. Straub

[57] ABSTRACT

Plurality of encoding methods and apparatus for encoding video data in a manner that makes it well suited for decoding by either regular or downconverting decoders are described. In one embodiment, the selection and/or generation of motion vectors by an encoder is controlled so that only motion vectors having a size that corresponds to an integer multiple of a downsampling rate expected to be used by a downconverting decoder are generated and/or selected. In another embodiment, motion vectors having a size which corresponds to an integer multiple of an expected downsampling rate are preferred over other motion vectors. In various additional encoder embodiments feedback circuitry which models a downconverting decoder, and/or which provides feedback information on downconverted images generated by decoding the compressed video data generated by the encoder using a downconverting decoder, are incorporated into the encoder of the present invention.

17 Claims, 5 Drawing Sheets

U.S. PATENT DOCUMENTS

| | | | |
|---|---|---|---|
| 5,459,514 | 10/1995 | Sakamoto et al. | 348/398 |
| 5,463,656 | 10/1995 | Polivka et al. | 375/200 |
| 5,479,527 | 12/1995 | Chen | 382/232 |
| 5,495,292 | 2/1996 | Zhang et al. | 348/407 |
| 5,497,435 | 3/1996 | Berger | 382/249 |
| 5,502,571 | 3/1996 | Decotignie et al. | 358/310 |
| 5,559,808 | 9/1996 | Kostreski et al. | 370/108 |
| 5,565,921 | 10/1996 | Sasaki et al. | 348/409 |
| 5,570,197 | 10/1996 | Boon | 386/46 |
| 5,583,573 | 12/1996 | Asamura et al. | 348/420 |
| 5,589,993 | 12/1996 | Naimpally | 348/390 |
| 5,598,222 | 1/1997 | Lane | 348/565 |
| 5,623,312 | 4/1997 | Yan et al. | 348/409 |
| 5,691,768 | 11/1997 | Civanlar et al. | 348/392 |
| 5,699,128 | 12/1997 | Hayashi | 348/407 |
| 5,734,419 | 3/1998 | Botsford, III et al. | 348/97 |
| 5,737,022 | 4/1998 | Yamaguchi et al. | 348/416 |
| 5,751,375 | 5/1998 | Ninomiya et al. | 348/571 |
| 5,847,761 | 12/1998 | Uz et al. | 348/404 |
| 5,878,166 | 3/1999 | Legall | 348/400 |
| 5,903,313 | 5/1999 | Tucker et al. | 348/416 |

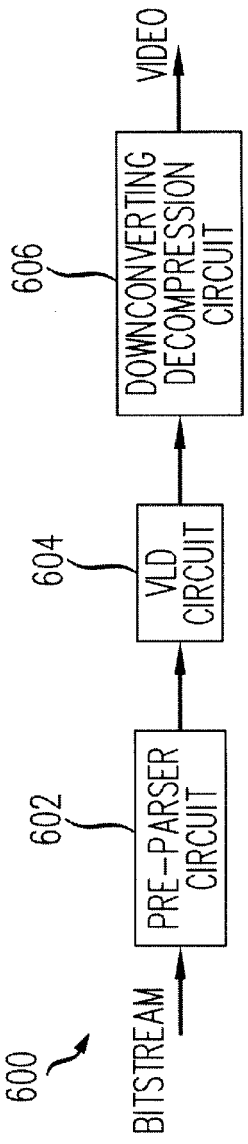
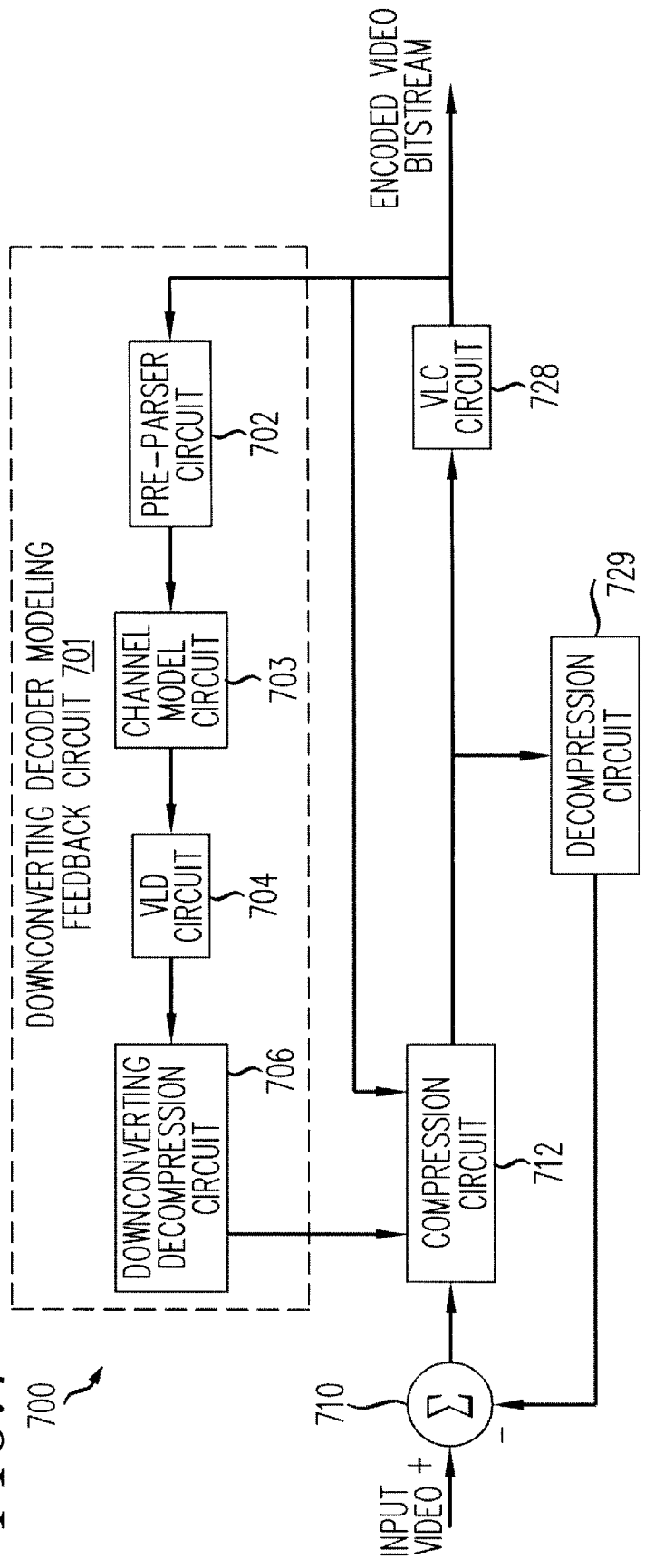

METHODS AND APPARATUS FOR ENCODING VIDEO DATA USING MOTION VECTORS FOR DECODING BY REGULAR OR DOWNCONVERTING DECODERS

RELATED APPLICATIONS

This application is a division of patent application Ser. No. 08/587,207 filed Jan. 16, 1996, now U.S. Pat. No. 5,825,927 and entitled "Methods and Apparatus for Encoding Video Data in a Manner that is Well suited for Decoding by Regular or Downconverting Decoders".

FIELD OF THE INVENTION

The present invention is directed to video encoders, and more particularly, to methods and apparatus for encoding video data in a manner that makes it particularly well suited for decoding by either regular or downconverting decoders.

BACKGROUND OF THE INVENTION

The use of digital video signals to represent video data is becoming commonplace. Various encoding and data compression methods have been proposed for the encoding and transmission of video signals.

The International Organization for Standardization has set a standard for video data compression for generating a compressed digital data stream that is expected to be used for digital television. This standard is referred to as the ISO MPEG standard (International Organization for Standardization—Moving Picture Experts Group) or simply the MPEG standard.

One version of the MPEG standard, MPEG-2, is described in the International Standards Organization—Moving Picture Experts Group, Drafts of Recommendation H.262, ISO/IEC 13818-1 and 13818-2 titled "Information Technology—Generic Coding of Moving Pictures and Associated Audio". The MPEG-2 standard provides a large amount of discretion with regard to encoding practices and to a large extent serves primarily to define what capabilities a reference decoder must have to decode a stream of MPEG video data.

Recommendations for the encoding of video and audio information in accordance with the MPEG standard are set forth in a document referred to as Test Model 5, ISO-IEC/JTC1/SC29/WG11 Coded Representation of Picture and Audio Information dated April 1993 (hereinafter "the MPEG-2 Test Model").

The MPEG standard as well as other digital encoding methods allow video images to be represented using different amounts of data. Generally, the more data used to represent a video image, e.g., frame, the more faithful the representation of the image. For example, a frame of video may be encoded, in accordance with MPEG-2 as high definition (HD), or standard definition (SD) video signals. In this application HD is used to refer to video signals or images having a higher degree of resolution than standard analog NTSC video images while SD is used to refer to video signals or images having approximately the same resolution as standard analog NTSC video images.

Generally, it has been the practice to encode and decode video data using encoders and decoders which are matched to the degree of resolution used to represent the video images. For example, as illustrated in FIG. 1A a HD video decoder is normally used to decode HD bitstream generated by a HD encoder 12. Similarly, a SD video decoder 18 is normally used to decode a SD video bitstream such as the SD bitstream generated by the SD Encoder 16 illustrated in FIG. 1B. By using a decoder matched to the encoder, the encoded bitstream is normally decoded at or near the full resolution at which is encoded.

Because of the higher memory requirements and the general complexity of an HD decoder, HD decoders generally cost more to implement than SD decoders. In the area of low cost electronics, e.g., low end consumer electronics, cost is a major factor in determining a products success in the market place. In order to reduce the cost of a high definition decoder, various techniques may be used to reduce the data rate and/or resolution of the video frames in an encoded bitstream and/or the amount of processing that must be performed as part of the decoding process. Such data reduction and video processing techniques, e.g., downsampling, will be referred to generally as downconverting. Downconverting generally results in lower quality, e.g., lower resolution video images being generated than would result if the encoded bitstream were decoded without downconverting. Decoders which perform downconverting as part of the decoding process are referred to as downconverting decoders.

When a high resolution, e.g., HDTV, bitstream is downconverted, the resulting image quality is dependent on choices made by the original encoder, e.g., the HD encoder at encoding time.

Referring now to FIG. 2, there is illustrated a known encoder 20 for encoding video signals as, e.g., HD video signals.

The known encoder 20 includes a summer 26, a compression circuit 27, a variable length coding (VLC) circuit 28 and a decompression circuit 29. As illustrated, a summing input of the summer 26 receives the input video signal. A video feedback signal which is provided by the decompression circuit 29 is subtracted from the input signal by the summer 26 to produce the video prediction error signal which is supplied to an input of the compression circuit 27. The compression circuit performs data compression, e.g., by performing discrete cosine transform (DCT), coding and quantization, on the video bitstream.

The compressed video bitstream output by the compression circuit 27 is supplied to an input of the VLC circuit 28 and the decompression circuit 29. The decompression circuit 29 decompresses the compressed video bitstream to generate the feedback signal supplied to the summer 26. The feedback signal is used to facilitate the data compression operation performed by the compression circuit 27 and to minimize artifacts therefrom. The VLC circuit variable length encodes the compressed video bitstream output by the compression circuit 27 and supplies a feedback signal to the compression circuit for controlling the quantization rate and thus the amount of data compression to insure, e.g., that the bitrate output by the VLC circuit is maintained within the desired bounds.

Referring now briefly to FIG. 3, the known encoder circuit 20 is illustrated in greater detail. As illustrated in FIG. 3, the compression circuit of the known decoder includes a discrete cosine transform (DCT) circuit 330 which receives the video bitstream to be compressed and performs discrete cosine transform coding operations thereon. The output of the DCT circuit 330 is coupled to the input of a quantization circuit 332. The quantization circuit 332 receives as a control signal an input from an MQUANT selection circuit 334 where the value MQUANT is used to control the quantization scale factor used during quantization. The MQUANT selection circuit 334 is coupled to an output of the VLC circuit 28 and is responsible for selecting a quantization scale factor which will achieve the desired data rate as a function of the feedback information obtained from the VLC circuit 28. The quantized video signal output by the quantization circuit 332 is the compressed video signal that is supplied to the input of the VLC circuit 28 and the decompression circuit 29.

The decompression circuit 29 comprises an inverse quantization circuit 340 coupled to an inverse discrete cosine transform (IDCT) circuit 341. As is known in the art the output of the IDCT circuit 341 is coupled to a first summing input of a summer 342. A second input of the summer 342 is coupled to the output of a motion compensation circuit 344. The output of the summer 342 is coupled to an input of an anchor frame storage unit 343 which has a first output coupled to an input of a motion estimation circuit 345. A second output of the anchor frame storage unit 343 is coupled to a first input of the motion compensation circuit 344 while a second input of the motion compensation circuit 344 is coupled to an output of the motion estimation circuit 345. The output of the motion compensation circuit 344 represents a predicted picture which is used as a feedback signal to the summer 342 and the summer 26. The various elements of the decompression circuit 29 work together as is known in the art, to decompress the compressed video bitstream output by the compression circuit 27 and to provide a feedback video signal, which, in the case of video data that is being inter-coded, is selectively subtracted from the input video signal by the summer 26 as is known in the art.

While the known encoder circuit 20 provides feedback from the VLC circuit to control the output bit rate and includes a decompression circuit which provides feedback relating to the full decoding of the compressed video bitstream, the known encoder fails to include circuitry to take into consideration the effect that downconverting will have on the video data being encoded or the effect that various downconverting decoder processing or data storage limitations may have on the ability to decode the video bitstream generated by the known encoder. For example, the known decoder circuit 20 fails to take into account the effect of discarding high frequency DCT coefficients and/or downsampling the encoded video data will have on downconverted image quality.

In order to enhance the quality of video images generated by a downconverting decoder, there is a need for encoder methods and apparatus which can produce a high resolution, e.g., a HD, bitstream which is well suited for decoding by both a downconverting decoder as well as a high resolution decoder.

Furthermore, it is desirable that an encoder be capable of taking into account the effect of various anticipated downconverting operations, e.g., downsampling, will have on the quality of encoded video that is decoded by a downconverting video decoder. It is also desirable that an encoder be capable of taking into consideration data processing limitations, e.g., buffer size limitations, that may exist in downconverting decoders that are expected to be used to decode the video bitstream generated by the encoder.

SUMMARY OF THE PRESENT INVENTION

The present invention is directed to a plurality of encoding methods and apparatus for encoding video data in a manner that makes it well suited for decoding by either regular or downconverting decoders.

Numerous encoding methods and apparatus for increasing the quality of downconverted images are described. Many of the described encoding methods and apparatus improve the quality of downconverted images, as compared to known encoding methods and apparatus, while having little effect on the quality of the images produced from the encoded data when it is decoded using a full resolution decoder.

In one embodiment, the selection and/or generation of motion vectors by an encoder is controlled so that only motion vectors having a size which corresponds to an integer multiple of the anticipated horizontal and/or vertical downsampling rate expected to be used by a downconverting decoder, are generated and/or selected.

In another embodiment, motion vectors which have a size corresponding to an integer multiple of the expected horizontal and/or vertical downsampling ratios are preferred over other motion vectors.

In various encoder embodiments of the present invention, feedback circuitry which models a downconverting decoder, and/or which provides feedback information on the quality of downconverted images generated by decoding the compressed video data generated by the encoder of the present invention using a downconverting decoder, are incorporated in the encoder of the present invention.

In accordance with one embodiment of the present invention, when encoding macroblocks of interlaced pictures, the encoder according to the present invention selects either field or frame mode for the arrangement of 8×8 blocks for IDCT processing and then uses the selected mode for the encoding of macroblocks in a consistent and predictable manner. By controlling the selection of either field or frame modes of operation and then using the encoding mode consistently, a downconverting converter can more easily match the downsampling method to the encoding mode. When an encoder switches between the two modes frequently, it becomes difficult for a downconverting decoder to apply downsampling that matches the encoding mode. Various embodiments of the encoder of the present invention which control field or frame modes of encoding operation are discussed in the detailed description which follows.

In addition to the encoder methods and apparatus discussed above, various selections for the spacing of I, P, and B frames in a group of pictures (GOP) are also discussed in the following detailed description as well as numerous variations of the various embodiments of the present invention.

Possible downconverting decoder post processing operations, e.g., blurring of I and P frames to reduce variations in downconverted image quality from frame to frame are also described.

Many other features and embodiments of the present invention are described in detail below.

BRIEF DESCRIPTION OF THE DRAWINGS

FIG. 6 illustrates a downconverting decoder circuit.

FIG. 7 illustrates an encoder implemented in accordance with one embodiment of the present invention.

DETAILED DESCRIPTION

The present invention is directed to video encoders, and more particularly, to methods and apparatus for encoding video data in a manner that makes it particularly well suited for decoding by either regular or downconverting decoders.

Figure 4:
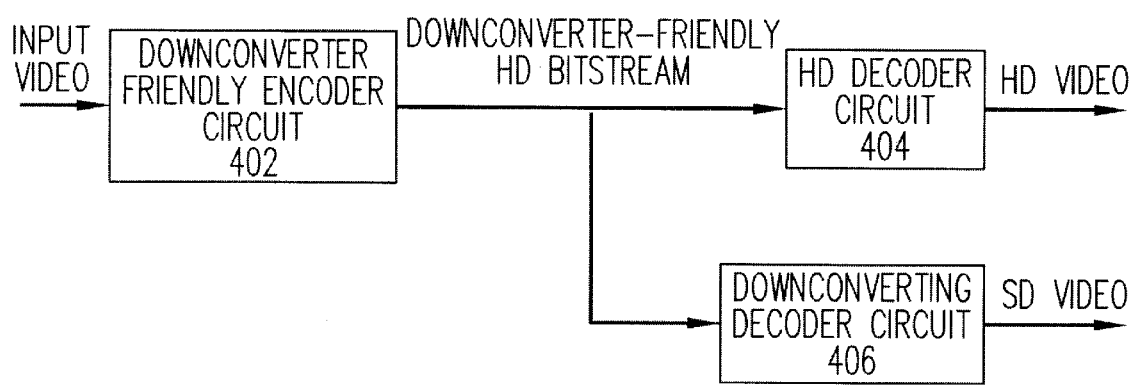
FIG. 4 is a block diagram of a system incorporating a downconverter friendly encoder circuit implemented in accordance with the present invention coupled to a HD decoder circuit and a downconverting decoder circuit.

Referring now to FIG. 4, there is illustrated a system for encoding and decoding video data implemented in accordance with one embodiment of the present invention. The system includes a downconverter friendly encoder circuit 402 coupled to a HD decoder circuit 404 and a downconverting decoder circuit 406.

Figure 5:
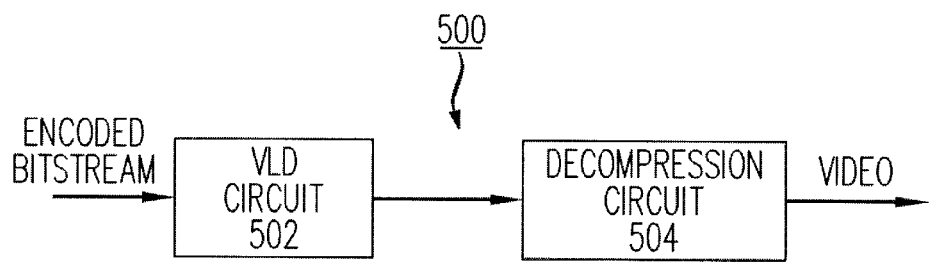
FIG. 5 illustrates a known decoder circuit.

The HD decoder circuit 404 may be the same as or similar to the known decoder circuit 500 illustrated in FIG. 5. As illustrated in FIG. 5, the known decoder circuit 500 includes a variable length decoder (VLD) circuit 502 coupled to a decompression circuit 504. The VLD circuit 502 receives the encoded bitstream and performs variable length decoding thereon. The variable length decoded data stream is then supplied to the input of the decompression circuit 504 which decompresses the video data stream to generate a video data stream which can be displayed. Because the known decoder illustrated in FIG. 5 does not include a preparser and does not perform downsampling, the received video stream is decoded at full resolution. Thus, if a decoder 500 is used to decode a HD bitstream it will produce HD video images or frames as opposed to a downconverting decoder which would produce lower quality and/or lower resolution video images or frames when decoding the same bitstream.

In one embodiment, the downconverting decoder circuit 406 is the same as or similar to the decoder circuit described in U.S. patent application Ser. No. 08/339,436 titled "METHODS AND APPARATUS FOR IMPLEMENTING A LOW COST JOINT HD/SD TELEVISION DECODER" which is hereby expressly incorporated by reference.

Figure 1A:
FIG. 1A is a block diagram of a known system for encoding and decoding high definition video signals.
Figure 1B:
FIG. 1B is a block diagram of a known system for encoding and decoding standard definition video signals.
Figure 2:
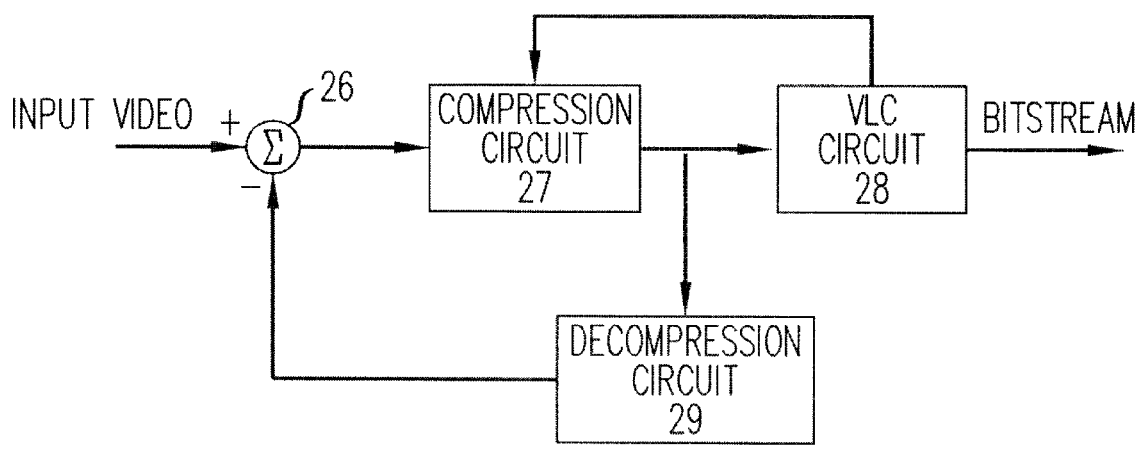
FIG. 2 is a block diagram of a known encoder circuit which may be used as the encoder of either FIGS. 1A or 1B.
Figure 3:
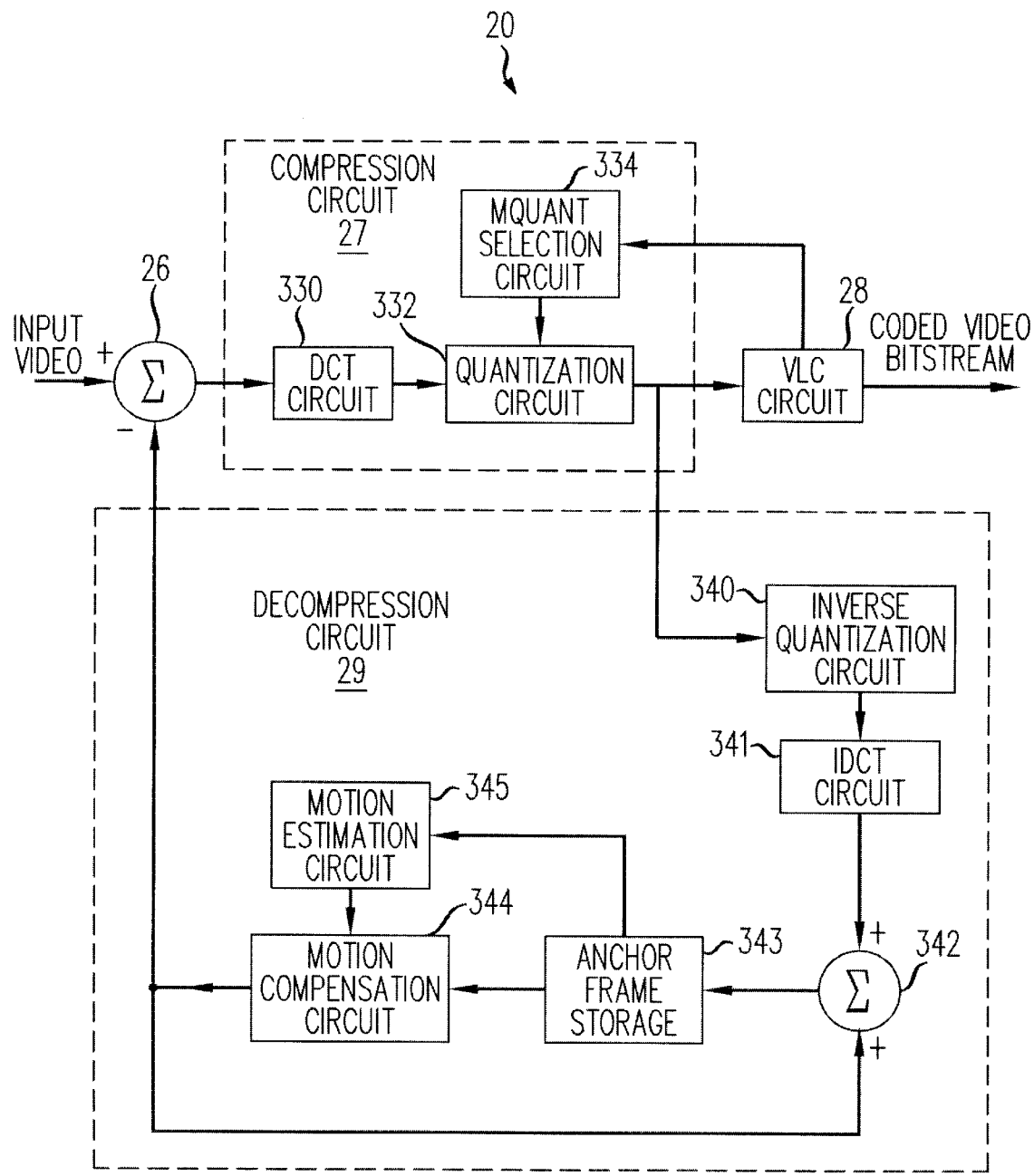
FIG. 3 is a more detailed block diagram of the known encoder circuit of FIG. 2.

The downconverting decoder circuit 406 may also be implemented using the decoder circuit 600 illustrated in FIG. 6. The downconverting decoder circuit 600 comprises a pre-parser circuit 602, a VLD circuit 604 and a downconverting decompression circuit 606. The pre-parser 602 is used to discard data from the received bitstream and, in various embodiments, to limit the number of bits output by the preparser to insure that the data storage and processing capabilities of subsequent decoder elements, e.g., data buffer, are not exceeded. The VLD circuit 604 is responsible for variable length decoding the video bitstream output by the preparser circuit 602. In the decoder embodiment of FIG. 6, the output of the VLD circuit 604 is supplied to the input to the downconverting decompression circuit 606. In one embodiment, as part of the decompression process, the circuit 606 horizontally and vertically downsamples the video images represented by data in the video bitstream thereby reducing the amount of data used to represent each video image. The downsampled video images, e.g., video frames, are then output as reduced resolution video images. As illustrated in FIGS. 2 and 3, known encoders, e.g., HD decoders, typically have a single loop, e.g., the decompression circuit 29 in which a model of the full resolution decoder is kept. The decoder model is provided so that predictions can be made from what a decoder reconstructs as anchor frames rather than the input frames themselves. Accordingly, typical known encoders include a single decoder modeling loop and do not consider downconverted image quality when encoding data.

In accordance with various embodiments of the present invention, two decoder modeling loops are used in the encoder instead of a single loop. The first loop includes a model of a full resolution decoder while the second loop includes a model of all or a portion of a downconverting decoder. In accordance with one embodiment of a two loop encoder, the encoder attempts to control the amount of drift that will occur in the images generated by the downconverting decoder circuit 406 while still using the model of the full resolution decoder.

Referring now to FIG. 7, there is illustrated one embodiment of what may be described as a two loop downconverter friendly video encoder 700, implemented in accordance with one particular embodiment of the present invention. The encoder 700 includes a downconverting decoder modeling feedback (DDMF) circuit 701, a summer 710, a compression circuit 712, a VLC circuit 728, and a decompression circuit 729. The decompression circuit 729 acts as a first feedback loop and serves to model a full resolution decoder while the DDMF circuit 701 acts as a second feedback loop which serves to model a downconverting decoder.

The summer 710 receives the input video signal at a summing input and a feedback signal from the output of the decompression circuit 729 at a subtracting input. The summer 710 is controlled to subtract the feedback video signal from the input video signal, as known in the art, when encoding the input video as inter coded video images. The output of the summer 710 is coupled to the input of the compression circuit 712 which performs data compression on the video data being encoded. The compression circuit 712 receives as control signals a feedback signal from the VLC circuit 728 and the output of the DDMF circuit 701.

The compressed video data output by the compression circuit 712 is supplied to the input of the VLC circuit 728. The VLC circuit 728 variable length encodes the compressed video data to generate the encoded video bitstream produced by the encoder 700.

The DDMF circuit 701 includes a pre-parser circuit 702, a downconverter channel model circuit 703, a VLD circuit 704 and a downconverting decompression circuit 706 coupled together as illustrated in FIG. 7. As is apparent from a comparison of the downconvertering decoder of FIG. 6 and the DDMF circuit 701, the DDMF circuit includes many of the same or similar elements as does the downconverting decoder 600 of FIG. 6. The downconverter channel model 703 models a downconverting decoder's channel buffer and provides feedback information to the compression circuit to insure that the data will not be encoded in such a manner that a downconverting decoder's channel buffers will overflow. By providing such a model, it is possible to avoid the need to provide large buffers in a downconverting decoder to deal with what would otherwise be a somewhat unpredictable worst case encoded bitstream. It can also ensure that downconverting decoders which are capable of discarding data in order to avoid overflow of their reduced size channel buffers do not, in fact, have to do so.

Figure 8:
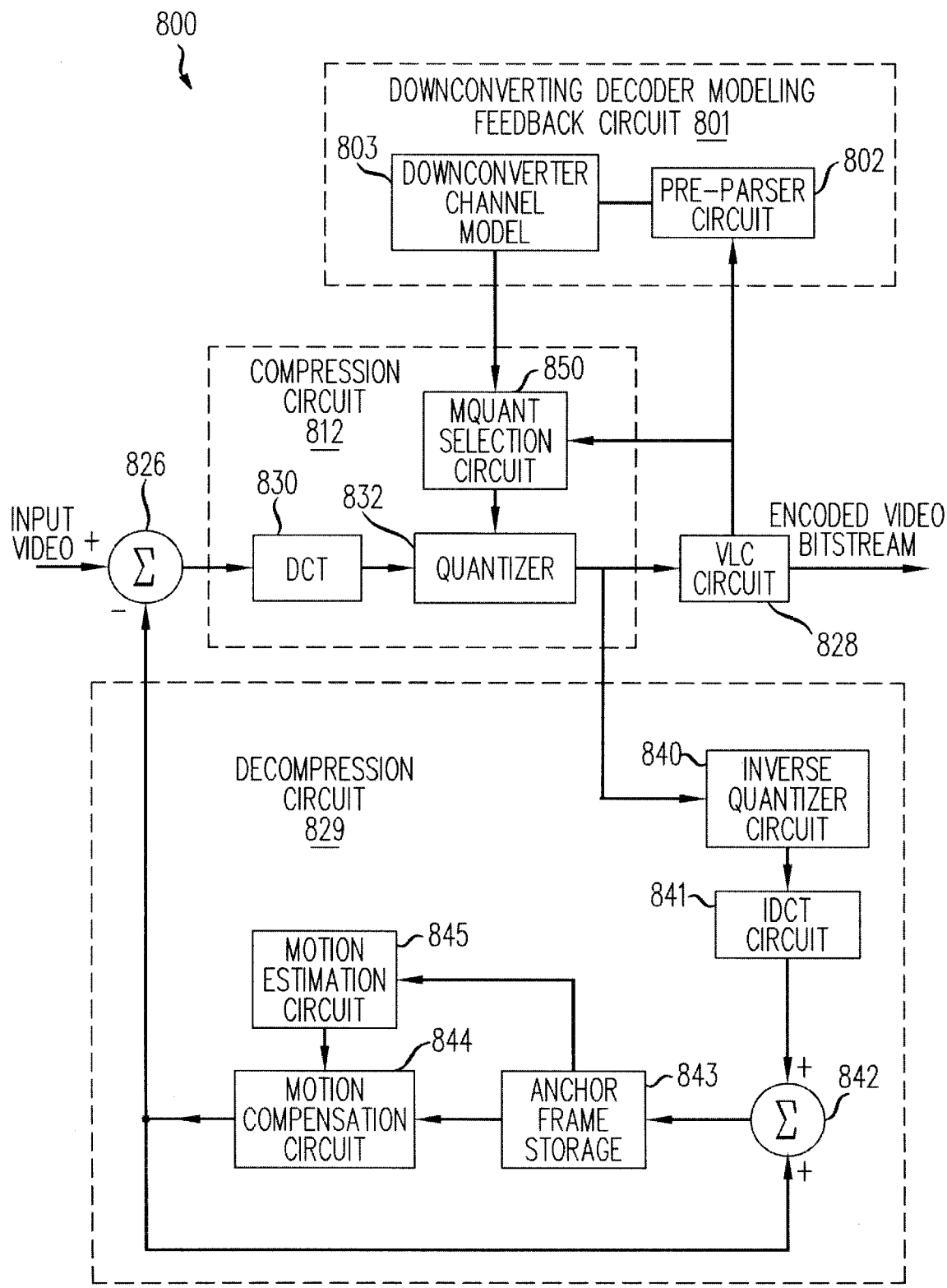
FIG. 8 illustrates an encoder implemented in accordance with a second embodiment of the present invention.

Referring now to FIG. 8, there is illustrated another embodiment of a two loop downconverting friendly encoder, an encoder circuit 800. The encoder circuit 800 comprises a summer 826, a compression circuit 812, a DDMF circuit 801, a VLC circuit 828, and a decompression circuit 829 coupled together as illustrated in FIG. 8 in a manner that is the same as or similar to the way like named elements of the encoder 700 are coupled to each other.

The decompression circuit 829 comprises an inverse quantizer circuitry 840 which is coupled to an IDCT circuit 841. The IDCT circuit in turn, has an output coupled to a first summing input of a summer 842. The summer 842 has a second summing input coupled to the output of a motion compensation circuit 844 and an output coupled to the input of an anchor frame storage unit 843. A first output of the anchor frame storage unit 843 is coupled to an input of a motion estimation circuit 845. A second output of the unit 843 is coupled to an input of the motion compensation circuit 844. The output of the motion estimation circuit 845 is coupled to an input of the motion compensation circuit 844 which produces the output of the decompression circuit 829. Because the various elements of the decompression circuit are the same as or similar to those of the decompression circuit 29, the various elements will not be described again in detail. It should be noted however, that the motion estimation circuits 845 and motion compensation circuit 844 may be controlled in accordance with various embodiments of the present invention, to generate, select and/or process, e.g., motion vectors in a manner according to the present invention which results in better downconverted image quality than when known motion estimation and motion compensation methods are used.

The compression circuit 812 of the encoder 800 includes a DCT circuit 830 having an input coupled to the output of the summer 826. The DCT circuit 830, in turn, has its output coupled to the input of a quantizer 832. The quantizer 832 also receives a quantization scale factor control signal from an MQUANT selection circuit 850. The MQUANT selection circuit 850 selects the quantization scale factor used by the quantizer as a function of the output of the VLC circuit 828 and the DDMF circuit 801.

In the embodiment of FIG. 8, the DDMF circuit includes a preparser circuit 802 and a downconverter channel modeling circuit 803. The preparser 802 receives the encoded video bitstream output by the VLC circuit 828 supplies information to the downconverter channel modeling circuit 803 relating to the effect preparsing has on downconverting buffer fullness.

In this embodiment, the encoder 800 includes a model of a downconverting decoder's preparser, the preparser circuit 802, and keeps track of downconverter buffer fullness both before and after preparsing by, e.g., using the downconverter channel modeling circuit 803. As a function of the output of the downconverter channel model 803 and the VLC circuit 828, the MQUANT selection circuit 850 selects quantization scale factors that insure that the buffers of a full resolution decoder and the reduced size channel buffer for pre-parsed data that may be used in a downconverting decoder, will not overflow.

It is desirable to accurately match the model of preparser circuit model and downconverter channel model to the preparser and channel buffers that will actually be used in the downconverting decoder which is intended to decode the encoded bitstream being generated.

In various embodiments of the present invention, the downconverter friendly encoder circuit 402 is an MPEG encoder which produces an encoded video bitstream including intra-coded frames (I frames), predictively encoded video frames (P frames) and bi-directionally encoded video frames (B frames).

MPEG-2 allows motion vectors in half-pel resolution. Generally, such motion vectors are selected by encoders to yield the lowest Mean Absolute Difference (MAD) between the prediction and the source video.

The known block matching motion vector search algorithm is set forth in the following pseudo code:

--- for vertical offset in vertical search range
    for horizontal offset in horizontal search range
        find MAD of macroblock and prediction macroblock
        if MAD < $MAD_{min}$
            $MAD_{min}$ = MAD
            motion_vector =
                      (horizontal offset, vertical offset)
where $MAD_{min}$ is the minimum possible absolute difference

---

While the known block matching motion vector search algorithm approach works well in terms of achieved data compression and resulting image quality when the encoded video bitstream is decoded at the full resolution, it has the disadvantage of frequently introducing drift when the encoded video images are decoded using a downconverting decoder as will be discussed below.

There is a range of choices the encoder circuit 402 of the present invention can make with regard to the generation and/or selection of motion vectors at encoding time to improve downconverted image quality.

One possibility which is implemented in one particular embodiment of the encoder circuit 402, is to restrict motion vectors to integer increments, e.g., multiples, of the horizontal and/or vertical downsampling rates associated with the anticipated downconverting decoding process.

In downconversion, e.g., where downsampling of a HD image is performed, every time a motion vector is used that is not an integral unit multiple size of the amount of downsampling, drift will occur between the downconverted image and the HD image. Accordingly, when using a downconverting decoder 406, it is desirable that the encoder 402 use motion vectors whose components are integral multiples of the amount of downsampling that is expected to be performed by the downconverting decoder 406.

For example, a 1920×1080 format may be used for a HD signal being encoded. If it is intended that the encoded HD bitstream be suitable for decoding by HD decoders at full resolution, in addition to downconverting decoders which support a 640×540 format, which requires downsampling of the HD signal at a ratio of 3:1 horizontally and 2:1, vertically, it is desirable that the motion vectors always be in units of ±3 horizontally and ±2 vertically for downconverting purposes.

As another example, consider a video signal having a 1280×720 progressive format which is intended to be decoded using a downconverting decoder which supports a 640×360 progressive format, a reduction in the resolution of 2×2 will occur in the downconverting decoder. In such a case, it is desirable, for downconverting purposes, that motion vectors be restricted at encoding time to units of ±2 both horizontally and vertically.

The block matching motion vector search algorithm for the encoder embodiment of the present invention which restricts motion vectors to integral units of the downconverter's downsampling ratios is set forth in the following pseudo code:

```
            for vertical offset in vertical search range with offset
                matching downconverting decoder's expected
                vertical downsampling ratio
                    for horizontal offset in horizontal search range with offset
                        matching downconverting decoder's expected
                    horizontal downsampling ratio
                        find MAD < MADmin
                        MADmin = MAD
                        motion_vector =
                            (horizontal offset, vertical offset)
```

Tests have been performed allowing only a 2×2 resolution for motion vectors for P frames in a progressive sequence and a 2 vertical×3 horizontal resolution grid for interlaced sequences which matched the corresponding amount of downsampling performed by a downconverting decoder used to decode the encoded sequences. The amount of drift that occurred during downconversion, based on prediction was dramatically reduced when the motion vectors were thus limited to be integral units of the downsampling ratios as compared to when motion vectors are selected to yield the lowest Mean Absolute Difference (MAD).

Such an approach of always limiting the motion vectors to multiples of the downsampling ratios may have some bitrate coding penalty associated with it as compared to when motion vectors are selected to yield the lowest MAD.

In order to balance any disadvantage in terms of a bitrate coding penalty vs. improved downconverted image quality, in one embodiment of the present invention the motion vector generation and/or selection process is biased to prefer motion vectors which are integral multiples of the anticipated downsampling ratios but not to restrict all motion vectors to be integral multiples of these ratios.

In such an embodiment, the encoder circuit 402 generates and/or selects, i.e., "snaps to", a motion vector corresponding to an integral unit of the decoder's downsampling ratios if the excess prediction error, MAD or means square error (MSE) over the best unconstrained prediction is below a preselected threshold.

Assume that in such an embodiment, the motion vector prediction which results in a minimum MAD produces a MAD of E1 and the snap grid motion vector, which is best integral multiple of a downconverting decoder's downsampling ratio, results in a MAD of E2. In such an embodiment, it is possible to determine if the snap grid motion vector or the motion vector which produces the minimum MAD should be used by comparing E2–E1 to the preselected threshold.

Preferring motion vectors which are integral multiples of downsampling ratios in this manner can be referred to as "snap grid" motion vector predication since motion vectors which fall at or near grid points corresponding to the points or grid locations along which downsampling is performed will result in motion vectors which are integral multiple of a downsampling rate being used.

The preselected threshold used for snap grid motion vector prediction may be a function of the ability of a viewer to notice the presence of an artifact in the particular macroblock being encoded. It may be adjusted by the encoder, e.g., for each GOP being encoded.

A snap-grid block matching motion vector search algorithm for the encoder embodiment of the present invention which includes a preference for motion vectors which are integral units of a downconverter's downsampling rate is set forth in the following pseudo code:

```
            for vertical offset in vertical search range
                for horizontal offset in horizontal search range
                    find MAD of macroblock and prediction block
                    if MAD < MADmin
                        MADmin = MAD
                        motion_vector
                            (horizontal offset, vertical offset)
                    if (horizontal offset, vertical offset) matches
                            downsampling ratios of downconverter
                        if MAD < MADsnap
                            MADsnap = MAD
                            snap_motion_vector
                                (horizontal offset, vertical offset)
            if MADsnap – Madmin < Threshold
                motion_vector = snap_motion vector
            where: MADmin is the MAD corresponding to the minimum
        possible absolute difference over the entire search range
                MADsnap is the MAD corresponding to the minimum
        possible absolute difference over the snap grid search range which is
        the grid point range corresponding to the downsampling points
                    snap_motion_vector is the motion vector
        corresponding to MADsnap
                    and where Threshold is the preselected threshold
        used to determine if the motion vector resulting in the minimum MAD
        should be used or if the motion vector resulting in an integral multiple
        of a decoder's downsampling rate should be used.
```

Since B frames are not used for subsequent predictions, there does not exist with B frames the problem of successive predictions becoming worse due to drift resulting from downsampling that exists for anchor frames, e.g., P frames.

In various embodiments of the present invention where the reduction in coding efficiency resulting from not selecting motion vectors resulting in a minimum MAD is of concern, the encoder circuit 402 applies the motion vector generation and selection processes of the present invention only to P frames. In such embodiments, no motion vector restrictions are place on B frames. If either of the above described motion vector calculation methods of the present invention were applied to B frames, the quality of B frames decoded by a downconverting decoder would be improved as compared to when no such restrictions were placed on B frame motion vectors.

It should be noted that there are typically many more B frames in a typical MPEG sequence so the effect on the quality of a video sequence decoded at full resolution will be somewhat greater when the motion vector restrictions discussed above are applied to B frames in addition to P frames than if they were applied only to P frames.

When B frame motion vectors decoded on a downconverting decoder 406 are not limited to integral multiples of the downsampling ratios, they will tend to have more drift and therefore be of lower quality than P frames generated with such limitations on the motion vectors and I frames. For some image sequences, this could cause a noticeable changes, e.g., pulsation, in image quality. There are two possible solutions to this problem.

The first solution is to apply the same limitations applied to P frame motion vectors to B frame motion vectors as well. However, such an approach may result in an undesirable decrease in image quality when the video signal is decoded at full resolution using, e.g., a HD decoder circuit 404.

The second approach is to apply postprocessing that will blur the I and P frames enough to lower their quality so that they match the quality of the B frames. By performing such decoding postprocessing annoying changes in relative image quality, as I, P and B frames are displayed, can be reduced.

P frames which occur late in a GOP tend to be of lower quality than P frames which occur earlier in the GOP due to the effect of successive predictions on P frame image quality.

Accordingly, in one embodiment of the present invention, the amount of blurring performed by the decoder circuit 406 is selectively varied from P frame to P frame with more blurring being applied to P frames that are early in a GOP than is applied to P frames later in a GOP. In this manner, the amount of blurring can be minimized and designed to achieve a uniform result in image quality.

Placing restrictions on motion vectors to improve the quality of downconverted images tends to have a negative impact on the quality of images generated by decoding the bitstream at full resolution using, e.g., the HD decoder circuit 404. It is desirable that the encoder control encoding such that reduction in full resolution image quality is distributed throughout a GOP for an overall reduction in quality rather than a pulsing in and out of quality.

The MPEG Test Model suggests allocations of relative numbers of bits to I, P and B frames. When using motion vectors which are selected or generated to enhance downconverted image quality, using e.g., the snap grid method described above, P frames should be allocated relatively more bits than described in the MPEG Test Model to compensate for the poorer prediction achieved using restricted motion vectors. The amount and range of motion in a video sequence will have a large affect on the amount of reallocation of bits amongst I, P and B frames that should be performed.

To reduce the bitrate encoding penalty associated with the use of restricted motion vectors, in one embodiment the encoder circuit 402 of the present invention applies motion vector restrictions only to P frames which are early in a GOP. In another embodiment, when the snap-grid motion vector selection method is being used, the decision threshold is scaled based on the position of a frame in a GOP so that motion vectors which are integer multiples of the anticipated downsampling rate will be preferred for P frames which occur earlier in a GOP. The reason behind this is that errors introduced early in the GOP will propagate throughout the GOP while errors introduced later in a GOP cause less damage to image quality because there will be less subsequent propagation. The position of a P frame in a GOP may be determined by its proximity to the earlier I frame with P frames which occur early in a GOP being located in close proximity to the I frame and P frames which occur late in a GOP being further away from the I frame which serves as the initial anchor frame in the GOP.

In addition to controlling motion vector size and selection of motion vectors, the encoder of the present invention can, and in various embodiments does, select between either field or frame modes of encoding for motion compensation when encoding interlaced pictures so that the encoding is performed in a consistent and predictable manner that facilitates subsequent downconverting.

When encoding interlaced pictures MPEG permits each macroblock to select either field or frame mode for the arrangement of 8×8 blocks for IDCT processing, and independently select either field or frame mode for motion compensation. In some known encoders, these modes are selected adaptively to maximize compression efficiency.

On feature of an encoder according to an embodiment of the present invention is the ability to preferentially select one of either the field or frame modes for motion compensation consistently and in a predictable manner when encoding interlaced images such that a downconverting decoder will be able to determine and/or predict the mode used for encoding the data and perform downsampling and upsampling in a manner that corresponds to the mode in which the data was encoded. This helps to reduce the amount of drift associated with the downconverting decoding process which is a result of mismatches between the resampling method and the encoding method which may occur when an encoder frequently and/or unpredictably switches between field or frame encoding methods.

In one exemplary embodiment, the encoding mode that is used for interlaced pictures is field based processing which is used in such an embodiment for both IDCT calculation purposes and motion compensation purposes.

While the encoding mode, e.g., field or frame mode, may be strictly adhered to when encoding all I, P, and B frames, in some embodiments, a preference as opposed to a strict requirement for a particular encoding mode is exhibited by an encoder of the present invention when encoding interlaced images. In one embodiment this preference is implemented by computing the prediction errors (e.g. Mean Squared Error or Mean Absolute Deviation) for both field and frame processing, and selecting the target mode unless its prediction error exceeds the alternative mode's prediction error by a positive margin or threshold. The threshold value may be varied according to picture type and position within a GOP to effect a varying amount of preference for the target mode, as described below.

In one such encoder embodiment, where a preference is exhibited for an encoding mode, e.g., field based processing of interlaced images, the preference that is exhibited by the encoder is greatest when encoding I frames, is less pronounced when encoding P frames and least pronounced when encoding B frames. The strength of the preference for an encoding mode may be a function of a frame's location within a GOP as well as the type of frame being encoded. For example, when encoding video data corresponding to P frames, the preference for the target encoding mode may be weaker for P frames which occur late in a GOP as compared to the preference for the target encoding mode exhibited when encoding P frames which occur early in a GOP.

Depending on the particular encoder embodiment, the preference for a particular encoding mode of operation may be enforced strictly, e.g., whereby all macroblocks in the picture use the target encoding mode, or softly, e.g., whereby the preference for the target encoding mode is applied to those macroblocks where a downconverter would most benefit and/or the output from a standard decoder would be degraded the least. In one particular embodiment, all macroblocks of I and P frames are coded using field mode and no restriction is placed on the coding of B frame macroblocks.

In addition, or as an alternative to, controlling motion vector selection and/or generation and the selection of field or frame based processing modes of encoder operation, various other things can be done by the encoder circuit 402 to improve the quality of images decoded using downconverting decoders 406.

For example, in accordance with one particular embodiment of the present invention wherein the downconverter friendly encoder circuit 402 acts as an MPEG encoder, the distance, N, between I frames, and the distance, M, between anchor frames, i.e., I and P frames, is selectively controlled by the encoder circuit 402 to enhance the quality of video signals decoded using a downconverting decoder.

Generally, when downsampling on a predictively coded video frame is performed, and the motion vectors were not calculated by an encoder as a multiple of the downsampling rate drift in the decoded video frame will occur.

Because each successive prediction depends on a previous prediction, the drift associated with the downconverting decoding process will be made worse with each successive prediction. Accordingly, when a downconverting decoder may be used to decode video, it is desirable to reduce the number of P frames between I frames to thereby reduce the number of successive predictions. In one embodiment of the present invention, the encoder circuit 402 achieves this desired result by using small values of N and/or a big M when generating an MPEG bitstream.

For example, instead of encoding a bitstream to have an N=15 and an M=3, which results in four P frames per group of pictures (GOP), which results in up to 5 successive predications counting the B frames off of the last P frame, the encoder circuit 402 selects N=9 and M=3 so that the GOP includes 2 P frames and hence a total of up to 3 successive predictions.

While small values of N increase the number of I frames in a bitstream and could theoretical hurt HD performance, the effect on the quality of a HD signal is small over a wide range of possible values of N, e.g., values of N ranging from 9 to 18. Using a lower value for N also has the advantage of reducing the amount of time required for a decoder to achieve signal acquisition since the average time between I frames is reduced.

A video bitstream is slightly harder to encode when large values for M are used, because larger frame memories are required as compared to when smaller values of M are used. However, the additional encoder memory requirements associated with using a large M are not a major deterrent to implementing an encoder in such a manner.

It should be noted that the use of large values of M, e.g., values in the range of 3 to 6, by the encoder circuit 402 may help HD performance because more B frames and fewer P frames will be used to encode a video signal.

It should be noted that a choice of M=1, i.e., where no B frames are used and the use of dual-prime prediction by an encoder of a video signal which may be decoded by a downconverting decoder is undesirable because of the large number of successive predictions.

In another embodiment of the present invention, the encoder circuit 402 of the present invention uses a formula for choosing whether a macroblock should be coded as an intra or non-intra coded macroblock in P and B frames that is different from the formula suggested in the MPEG-2 Test Model. In particular, the formula used in this particular embodiment of the present invention shows a greater preference for the use of intra coded macroblocks in P frames than does the test model. This reduces the number of predictions which causes the problem of drift associated with a downconverting decoder.

In addition to the various things suggested above, that an encoder can do to improve downconverted image quality, it is also possible to improve the quality of downconverted images by giving the encoder a greater preference for intra macroblocks in P frames than is suggested by the MPEG Test Model. Increasing the relative number of intra macroblocks in P frames reduces the number of successive predictions which, as discussed above, is a cause of drift in downconverted images.

It should be noted that while MPEG-2 terminology and examples of MPEG compliant bitstreams are frequently used in the above description of the present invention, the encoding methods and apparatus are generally applicable to a wide variety of digital encoding standards and may be applied to almost any situation where a digital bitstream is being generated to be decoded by two decoders which support different degrees of image resolution, for example, an SDTV decoder and a QCIF decoder.

What is claimed is:

1. A method of encoding video data at a first resolution to generate encoded video data which can be decoded by a downconverting decoder which downsamples the encoded video data at a first rate in the horizontal direction, the method comprising the steps of:
    generating horizontal motion vectors which are integral multiples of the first rate;
    including in an encoded bitstream generated by encoding the video signals only horizontal motion vectors which are integral multiples of the first rate so that all horizontal motion vectors included in the encoded video data are integral multiples of the first rate.

2. The method of claim 1, wherein the encoded video data can be decoded by a downconverting decoder which downsamples the encoded video data at a second rate in the vertical direction, the method further comprising the steps of:
    generating vertical motion vectors which are integral multiples of the second rate;
    including in an encoded bitstream generated by encoding the video signals only vertical motion vectors which are integral multiples of the first rate so that all vertical motion vectors included in the encoded video data are integral multiples of the second rate.

3. A method of encoding video images at a first resolution to generate an encoded video signal including I frames and P frames, for decoding by a downconverting decoder which performs downsampling at a factor of X in the horizontal direction, where X is a real number, comprising the steps of:
    generating horizontal motion vectors which are integral multiples of X;
    selecting horizontal motion vectors to be included in P frames generated by the encoding process, the step of selecting including the step of:
    preferring, for inclusion in P frames, horizontal motion vectors having values that are integral multiples of X, over horizontal motion vectors which have values other than integral multiples of X.

4. The method of claim 3, wherein the step of preferring horizontal motion vectors having values that are integral multiples of x includes the step of:
    for each horizontal motion vector:
        generating a first motion vector that has a value that is an integral multiple of x;
        generating a second motion vector;
        selecting, as a function of a threshold value, which of the first or second motion vectors to use when encoding video data.

5. The method of claim 4, wherein the threshold has a preselected value.

6. The method of claim 5, wherein the threshold value is dynamically determined as a function of the position within a group of pictures where the video data being encoded is located.

7. The method of claim 6, further the step of decoding the encoded video data and processing the encoded video data to blur P frames.

8. The method of claim 7, wherein the amount of blurring performed on a P frame is a function of the P frames location in a group of pictures, and wherein P frames which occur at the beginning of the group of pictures are blurred less than P frames occurring late in the group of pictures.

9. The method of claim 3, wherein the generated signal is also for decoding by a downconverting decoder which performs downsampling at a factor of Y in the vertical direction, where Y is a real number, the method further comprising the steps of:.

generating vertical motion vectors which are integral multiples of Y;

selecting vertical motion vectors to be included in P frames generated by the encoding process, the step of selecting including the step of:

preferring, for inclusion in P frames, vertical motion vectors having values that are integral multiples of Y, over vertical motion vectors which have values other than integral multiples of Y.

10. The method of claim 3, wherein a preference for horizontal motion vectors having values that are integral multiples of X, is also shown when encoding B frames.

11. The method of claim 3, wherein no preference for horizontal motion vectors having values that are integral multiples of X, is shown when encoding B frames.

12. The method of claim 3, further comprising the step of:

adaptively selecting the use of field or frame based processing for motion compensation, the step of adaptively selecting including the step of:

applying a preference for field based processing as a function of the type of frame being encoded.

13. The method of claim 12, wherein the preference which is applied for field based processing is greater when encoding I frames than B frames.

14. A method of encoding video data using either field or frame based processing, the method comprising the steps of:

adaptively selecting, as a function of the type of frame being encoded, the use of field or frame based processing to generate horizontal motion vectors;

wherein the types of frames being encoded include P and B frames; and wherein the step of adaptively selecting includes the step of applying a first preference for field based processing for the generation of motion vectors when encoding P frames which is greater than a second preference for field based processing that is applied when encoding B frames.

15. The method of claim 14, wherein the P and B frames are encoded in a group of pictures; and wherein the preference applied for field based processing when encoding P frames is a function of the position within the group of pictures of the individual P frame being encoded.

16. The method of claim 14, wherein the step of adaptively selecting the use of field or frame based processing is performed in a manner that does not maximize compression efficiency.

17. The method of claim 14, wherein use of the first and second preferences results in field based processing being used for the generation of P-frame motion vectors at a greater rate than the rate at which field based processing is used for the generation of B-frame motion vectors.

* * * * *